(12) United States Patent
Sanson

(10) Patent No.: US 9,280,801 B2
(45) Date of Patent: Mar. 8, 2016

(54) METHOD OF SEARCHING FOR PIXELS IN A MATRIX AND CIRCUIT IMPLEMENTING THE METHOD

(71) Applicant: SOCIÉTÉ FRANçAISE DE DÉTECTEURS INFRAROUGES-SOFRADIR, Châtenay Malabry (FR)

(72) Inventor: Eric Sanson, Grenoble (FR)

(73) Assignee: SOCIETE FRANCAISE DE DETECTEURS INFRAROUGES-SOFRADIR, Chatenay Malabry (FR)

( * ) Notice: Subject to any disclaimer, the term of this patent is extended or adjusted under 35 U.S.C. 154(b) by 6 days.

(21) Appl. No.: 14/375,646

(22) PCT Filed: Jan. 30, 2013

(86) PCT No.: PCT/FR2013/000031
§ 371 (c)(1),
(2) Date: Jul. 30, 2014

(87) PCT Pub. No.: WO2013/114012
PCT Pub. Date: Aug. 8, 2013

(65) Prior Publication Data
US 2015/0170319 A1    Jun. 18, 2015

(30) Foreign Application Priority Data

Jan. 30, 2012  (FR) .................................. 12 00267

(51) Int. Cl.
*H04N 5/372* (2011.01)
*G06T 1/20* (2006.01)

(52) U.S. Cl.
CPC ........................................ *G06T 1/20* (2013.01)

(58) Field of Classification Search
CPC ... H04N 5/23229; H04N 5/531; H04N 5/374; G06T 1/20
USPC .......... 250/208.1, 214 R, 214 DC; 348/222.1, 348/302–304; 345/173, 175
See application file for complete search history.

(56) References Cited

U.S. PATENT DOCUMENTS

| | | | |
|---|---|---|---|
| 4,638,354 A | 1/1987 | Denimal | |
| 4,713,535 A | 12/1987 | Rhoades | |
| 2003/0209650 A1 | 11/2003 | Boubal et al. | |
| 2013/0201361 A1* | 8/2013 | Yang | H04N 5/378 348/222.1 |

FOREIGN PATENT DOCUMENTS

| | | |
|---|---|---|
| EP | 0 157 141 A1 | 10/1985 |
| EP | 0 349 027 A1 | 1/1990 |
| GB | 2 113 949 A | 8/1983 |
| WO | WO 81/02084 A1 | 7/1981 |
| WO | WO 89/01129 A1 | 2/1989 |

OTHER PUBLICATIONS

Dudek, "Adaptive sensing and image processing with a general-purpose pixel-parallel sensor/processor array integrated circuit", *The International Workshop on Computer Architecture for Machine Perception and Sensing*, 2006, pp. 1-6.

(Continued)

*Primary Examiner* — Kevin Pyo
(74) *Attorney, Agent, or Firm* — Oliff PLC

(57) ABSTRACT

A pixel matrix is arranged in line of pixels. Each pixel is either in a first state or in a second state. The matrix mainly contains pixels in the second state. Each line of pixels is tested in order to determine whether it contains or not a pixel in a first state. The result from this test for each line is sent into a receiver. The lines including at least one pixel in the first state are more accurately analyzed in order to determine the position of this or these pixel in the line.

10 Claims, 4 Drawing Sheets

(56) References Cited

OTHER PUBLICATIONS

Emmanuel J. Candès et al., "An Introduction to Compressive Sampling," IEEE Signal Processing Magazine, vol. 25, No. 2, pp. 21-30, Mar. 2008.

Robert Dorfman, "The Detection of Defective Members of Large Populations," Ann. Math. Statisto, vol. 14, No. 4, pp. 436-440 (1943).

Anna C. Gilbert et al., "Group Testing and Sparse Signal Recovery," IEEE, pp. 1059-1063, 42nd Asilomar Conference on Signals, Systems and Computers, Oct. 2008.

J.J. Jaeger et al., "A Sparse Data Scan Circuit for Pixel Detector Readout," Nuclear Science Symposium and Medical Imaging Conference, pp. 400-402, 1992.

* cited by examiner

METHOD OF SEARCHING FOR PIXELS IN A MATRIX AND CIRCUIT IMPLEMENTING THE METHOD

TECHNICAL FIELD OF THE INVENTION

The invention relates to a search circuit for a piece of data in a first state within a matrix comprising data in a second state.

The invention also relates to a search method for a piece of data in a first state within a matrix comprising data in a second state.

STATE OF THE ART

Detection devices for an electromagnetic radiation can be used for observing a scene, and more particularly for tracking a particular element in a scene. For example, a particularly bright element can be tracked within a darker scene.

The bright element is represented in the pixel matrix of the detection device by a pixel or group of pixels which have a value equal to 1 or equal to 0 while the rest of the scene is in an opposite state. For example, the bright element is represented by a pixel in the high state '1' while the rest of the matrix is in the low state '0'.

In this way, the displacement of the bright element is made possible by tracking the position of the pixel or group of pixels in the high state within the matrix.

If the bright element moves rapidly, it is advantageous to rapidly determine the position of the pixel within the matrix.

For example, if the detector comprises 100000 pixels, and the time resolution of the detector is equal to 100 µs, the raw data rate is a billion bits per second. It is then necessary to have a search system that has a large bandwidth in order to process this data flow, which implies a high energy consumption.

In movable devices, it is necessary to control the power consumption of the various circuits therein. It results therefrom that the data from the photodetectors must be compressed in order to achieve a reasonable data rate and to limit the total consumption in this part of the movable device.

Conventionally, the search for atypical pixels within a pixel matrix is carried out recursively by dividing the matrix M into a plurality of submatrices S1, S2, S3 and S4. The initial matrix M is divided into several sub-matrices S and each sub-matrix S is tested in order to determine whether it contains an atypical pixel or not. When an atypical pixel is detected within a sub-matrix S, this sub-matrix is considered as the new matrix and this new matrix is divided, as previously mentioned, into a plurality of sub-matrices, for example S31, S32, S33, S34. This technique allows to determine the position of an atypical pixel within the matrix, but at the cost of a method which is very complex to implement and very energy intensive. Such a method of implementation is shown in FIG. 1 and in document US2003209650.

OBJECT OF THE INVENTION

It can be stated that there is a need to provide a search method for the position of a piece of data in a first state within a matrix mainly composed of data in a second state.

This need is fulfilled by using search method which includes the steps of, in a data matrix divided into a plurality of data lines, each of them being provided with nodes storing said data:

carrying out a first test for generally testing a data line in order to determine whether it contains a piece of data in the first state, and sending a code representative of this test into a receiver, the first test sending a first code when the data line includes a piece of data in the first state, and a second code in the other cases, carrying out a second test for individually testing nodes in the data line associated with a first code, the second test sending a third code when the node comprises a piece of data in the first state and a fourth code in the other cases, the results of the second test being sent into the receiver.

It can also be stated that there is a need to provide a search circuit able to determine the position of a piece of data in a first state within a data matrix mainly composed of data in a second state.

This need is fulfilled by using a circuit including:

the data matrix organized according to a plurality of data lines, each line comprising a plurality of data storage nodes, each storage node being configured so as to store a first state or a second state, the majority of the storage nodes being in the second state, a first test circuit for testing the state in a data line, the first test circuit being configured so as to determine whether the line tested has no storage node in the first state or the line tested comprises at least one storage node in the first state, the first circuit sending a first code when the line comprises at least one node in a first state or a second code when the line has no storage node in the first state, a second test circuit for testing the state of the storage nodes in a data line, the second test circuit being configured so as to send a third code when the storage node is in the first state or a fourth code when the storage node is in the second state, the second test circuit being configured so as to test a data line when the first test circuit has sent a first code relative to said line, a receiver configured so as to receive the result from the first test circuit for each line tested and to receive the result from the second test circuit for storage nodes.

BRIEF DESCRIPTION OF THE DRAWINGS

Other advantages and features will become more apparent from the following description of particular embodiments of the invention given as non-restrictive examples only and represented in the accompanying drawings, in which.

DESCRIPTION OF PREFERRED EMBODIMENTS OF THE INVENTION

Figure 1:
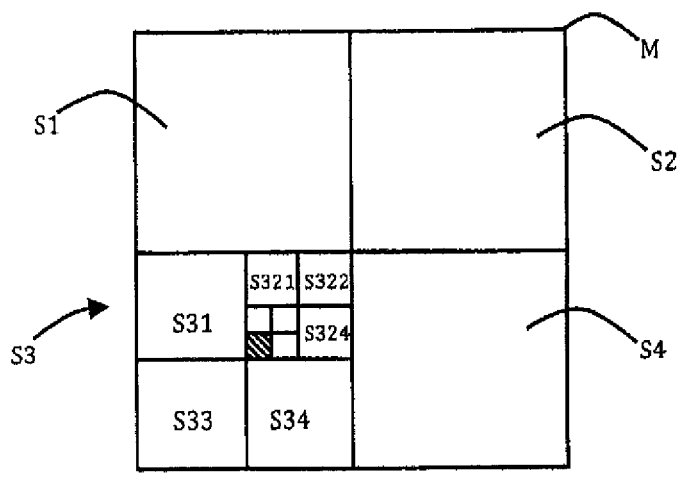
FIG. 1 schematically shows a search method in a detection circuit according to the prior art, FIG. 2 schematically shows a search circuit.

In a data matrix M, for example a pixel matrix, the information is arranged according to a plurality of data lines L. The data matrix M can represent an entire initial matrix or a part of an initial matrix. Advantageously, the data are arranged in rows or columns.

A line L can correspond to a row in the matrix M or a column in the matrix M. A line L can also correspond to a part of a row or a part of a column in the matrix M. In still another embodiment, a line can correspond to more than one row or more than one column in the matrix M.

In this case, a row or column in the matrix does not necessarily correspond to a line L but to a plurality of rows according to the way the matrix M is divided. For example, a row or column is divided into two, three or four subsets, each of them forming a line. The data matrix M can be divided according to various criteria in order to be arranged in a plurality of data lines.

Each line L comprises a plurality of data storage nodes. A storage node stores the unit data within the matrix. The storage node can be a pixel when the matrix controls images. The storage node contains a piece of information of the binary type 0 or 1, or high state and low state. More generally, a first state or a second state is stored in the storage node. The first state can be a high state or a low state or a state 0 or a state 1. The second state is different from the first state.

In order to quickly determine the position of the pixel(s) in a first state within a matrix of pixels which are mostly in a second state, it is advantageous to use a search circuit which rapidly determines which pixel is in a first state and which position in the matrix M is occupied by this pixel. The term 'pixel' is used instead of 'storage node' in order to facilitate the understanding of such a circuit and such a method in the case of an image analysis. However, the man skilled in the art will always have in mind that this embodiment can be applied to other technical fields, for which it is advantageous to search for data in a different minority state compared to the rest of the matrix. The matrix M has a significant number of rows comprising only pixels in the second state.

The expression 'matrix mainly in the second state' means a matrix which has at least 90% of the data in the second state and 10% of the data in the first state. The detection circuit is particularly advantageous when the matrix comprises less than 1% of data in the first state.

The search circuit comprises a first test circuit 1 for testing the state of a data line L within the matrix M. The first test circuit is configured so as to determine whether the line L tested has no storage node in the first state or the line L tested comprises at least one storage node in the first state. The first test circuit 1 analyses the entire data line L without analyzing the different pixels therein independently.

The first test circuit 1 sends a first code A or a second code B according to the result of the test. The first test circuit 1 sends the first code A when the data line L tested comprises at least one pixel in a first state. The first test circuit 1 sends the second code B when the line L has no pixel in the first state, i.e. when the line L includes only pixels in the second state. The result sent is encoded with a number of bits inferior to the number of nodes defining the line, which implies that the information is compressed. Thus, the first code A and the second code B represent a number of bits inferior to the number of nodes defining the line. Advantageously, the first code A and the second code B are encoded with one bit so as to have a maximal lossless compression. If the result sent is the second code B, the line is completely defined with a number of bits inferior to the number of nodes defining the line.

In this way, a first fast test is carried out line by line, which allows to test the entire matrix M in a reduced period particularly in case the number of pixels in the first state is very low. Advantageously, the line L is a row when there are fewer rows than columns and conversely the line L is a column when there are more rows than columns. In this manner, the test of the entire matrix M is minimized.

Advantageously, the lines are tested consecutively, according to a known sequence. For example, the lines are tested one after the other along a line test direction Y from one end of the matrix M to the opposite end of the matrix M. In this way, it is not necessary to assign a code representing the position of the line L within the matrix M. The position of the first code A or the second code B, representative of the state of the line within the compressed signal passing through the search circuit, can quickly determine the position of the line L and the state thereof. Other test sequences are possible, for example, advantageously, the first lines tested are selected among areas in the matrix which are considered as a priority because they have a greater probability of having a pixel in the first state.

The search circuit comprises a second test circuit 2 for testing the state of the storage nodes in a data line L. The second test circuit 2 is configured so as to test the state of the pixels within the data line.

The second test circuit 2 is configured so as to send a third code C when the pixel is in the first state or a fourth code D when the pixel is in the second state.

Advantageously, the second test circuit 2 is configured so as to test a data line when the first test circuit 1 has sent a first code A relative to this line L. Indeed, in order to save time and energy, the result from the first test indicates whether the line L contains or not at least one pixel in the first state.

If the result from the first test indicates that the line L has no pixel in the first state (second code B), it seems unnecessary to carry out a longer second test which must give the same result. By eliminating this second test, the line is characterized by one simple code (code B), which indicates that all pixels are in the second state.

In a preferred embodiment, during the second test, the pixels are tested one after the other in one pixel test direction X within a line. This feature allows not to necessarily associate a code relative to the position of the pixel within the line having the code relative to the state of the pixel. In this way, the signal passing through the search circuit is highly compressed and lossless. Even more preferably, the test direction is identical for all the lines in the matrix, which facilitates the signal analysis.

In an embodiment which can be combined with the previous ones, the second test circuit 2 analyses the entire pixel line L. Thus, the test circuit 2 sends a third code C or a fourth code D associated with each pixel in the line. There are thus as many third and fourth codes as pixels in the data line L. This embodiment also allows not to use an additional code for indicating the end of the line as the search circuit can include a memory area (not shown) in which the number of pixels is indicated for each data line L.

In a variant of the previous embodiment, the second test circuit analyzes the pixel line until a pixel in the first state is detected. Thus, the test circuit sends one or several fourth code(s) D and then a third code C representative of the first pixel in the first state within the line L. This third code C is also used as a code for indicating that the following piece of information relates to another data line L.

This embodiment is particularly advantageous when the proportion of pixels in the first state is low, for example it ranges from a few units to a few tens of units per matrix, which implies that the probability of having two pixels in the first state within the same line is zero or almost zero. This embodiment has little or no influence on a set of adjacent pixels in the first state within the same line as an edge of this pattern is detected, which allows to track a bright and dark pattern occupying more than one pixel within the data line.

In a particular embodiment, the search can be carried out with these two time-shifted alternative embodiments, for example in order to define the area occupied by one or several pixels in the first state. A complete test of the line can be carried out, then one or several reduced tests of the line can be carried out during the next acquisition steps. This sequence can be carried out cyclically with a predetermined period.

The search circuit comprises a reception device 3 for receiving the data sent by the first test circuit 1 and the second test circuit 2. The reception device 3, also called receiver 3, is connected to the first and second test circuits so as to receive the result from the first test circuit 1 for each data line L and the result from the second test circuit 2 for storage nodes.

The receiver contains the signal or part of the signal representative of the analysis of the data matrix M. This signal can be transmitted to a computing circuit 4 which analyzes the information representative of the matrix M. This signal is compressed and this compression can be lossless according to the embodiments, i.e. all the pixels have been characterized and the state of the pixel is associated with its position within the matrix M.

The signal generated comprises at least as many codes as lines analysed. It can also comprise a plurality of codes relative to the full or partial analysis of the lines comprising a pixel in the first state.

The test of the data lines and of the pixels within the lines L can be carried out in various ways.

In a first embodiment which can be combined with the previous embodiments, the first test circuit 1 carries out the analysis of all the data lines L, and this information is sent to the receiver 3. This first analysis allows to define a first signal portion representing a fast analysis of the matrix M. A code representative of the end of this analysis can be introduced into the receiver 3. The code can also be eliminated if the computing circuit receiving this signal knows the number of lines defining the matrix M.

Then, the second test circuit 2 carries out the analysis of the different lines L with which a first code A has been associated in order to form the second portion of the signal. The portions of the signal that are representative of the more accurate test of the different lines L are added into the receiver 3 in order of appearance of their associated line L in the first portion of the signal so as to facilitate the analysis.

In this case, the signal comprises a first portion representative of the fast analysis of the matrix, followed by a second portion representative of a more accurate analysis of the different lignes that each comprise a pixel in the first state.

Figure 2:
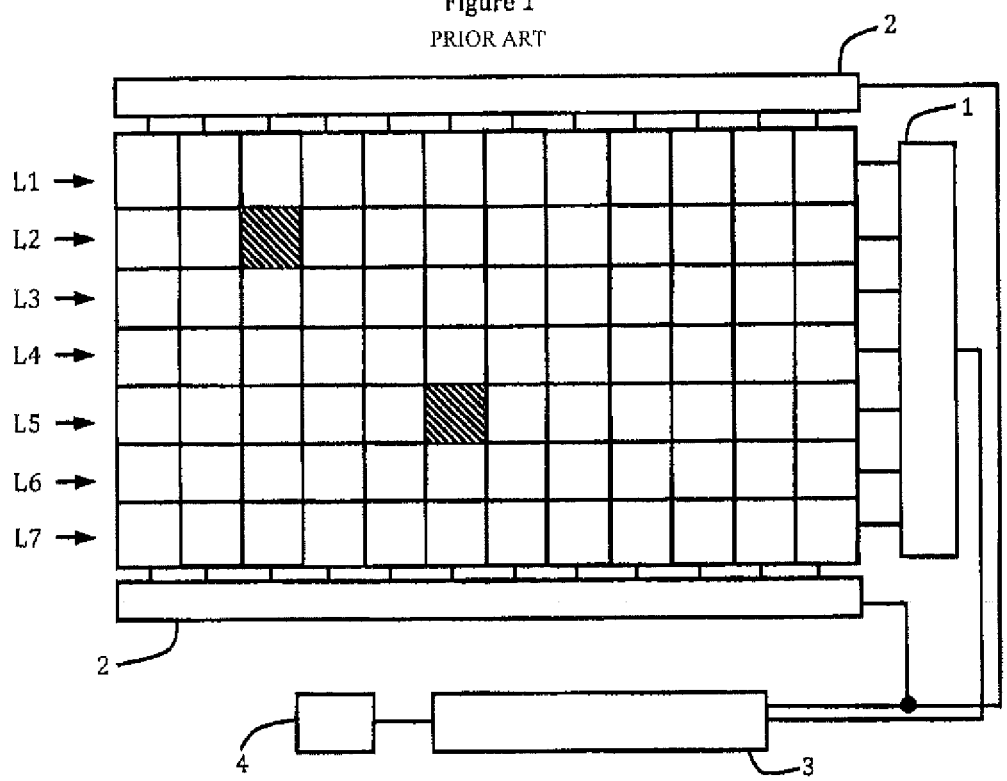

For example, the matrix M shown in FIG. 2 is analyzed so as to search for atypical pixels. The atypical pixels are represented by hachures in the matrix M. In the first test, the lines L are analyzed individually and in their entirety. The first line L1 has no pixel in the first state, the result from the test sends the code B into the receiver 3. The second line L2 comprises at least one pixel in the first state, the result from the test sends the code A into the receiver 3. The lines L3 and L4 have no pixel in the first state, the result from the test successively sends two codes B into the receiver 3. The line L5 comprises at least one pixel in the first state, the result from the test sends the code A into the receiver 3. The lines L6 and L7 comprise no pixel in the first state, the result from the test successively sends two codes B into the receiver 3.

The first portion of the signal defined by the first test of the matrix can be written as follows: BABBABB.

The second test is then carried out. As the line L1 has no atypical pixel, the second test is optional. The second test is carried out on the second line L2. The first two pixels are in the second state, the second test successively sends two codes D into the receptor 3. The third pixel is in the first state, the second test sends the code C into the receiver 3. The rest of the pixels in the ligne is in the second state, the second test sends here nine codes D into the receiver 3.

Advantageously, the lines L3 and L4 are not tested. The ligne L5 is subjected to the second test. The result of this test is expressed by the presence of five codes D representing the first five pixels in the second state, a code C for the pixel in the first state and six codes D for the rest of the pixels in the line in the second state.

The signal input into the receiver can be written as follows: BABBABB DDCDDDDDDDDD DDDDDCDDDDDD.

The signal has no spaces; the spaces allow only a better visual comprehension of the division of the signal among the various tests.

In an alternative embodiment relative to the previous one, the first test circuit 1 carries out the analysis of all the data lines L and the second test circuit 2 carries out the analysis of the data line when this line has a pixel in the first state and before the first test circuit 1 carries out the analysis of the next line L.

In this way, in the receiver, the first code A representative of a line L that has a pixel in the first state is followed by one or several third codes C and fourth codes D representative of the more accurate analysis of the line L. Once this analysis is over, the receiver comprises the result from the analysis of the next line by the first test circuit with a first code A and a second code B.

For example, the matrix M shown in FIG. 2 is analyzed in order to search for atypical pixels. The atypical pixels are represented by hachures in the matrix M. During the first test, the lines L are analyzed individually and in their entirety. The first line L1 has no pixel in the first state, the result from the test sends the code B into the receiver 3. As the line L1 has no atypical pixel, the second test is optional. The second line L2 comprises at least one pixel in the first state, the result from the test sends the code A into the receiver 3.

The second line L2 is subjected to the second test. The first two pixels are in the second state, the second test successively sends two codes D into the receptor 3. The third pixel is in the first state, the second test sends the code C into the receiver 3. The rest of the pixels in the line is in the second state, the second test sends here nine codes D into the receiver 3.

The test of the first two lines can be written as follows: BA DDCDDDDDDDDD.

The lines L3 and L4 have no pixel in the first state, the result from the test successively sends two codes B into the receiver 3. The line L5 comprises at least one pixel in the first state, the result form the test sends the code A into the receiver 3. The line L5 is subjected to the second test. The result from this test is expressed by the presence of five codes D representing the first five pixels in the second state, one code C for the pixel in the first state and six codes D for the rest of the pixels in the line in the second state.

The lines L6 and L7 have no pixel in the first state, the result from the test successively sends two codes B into the receiver 3.

Figure 3:
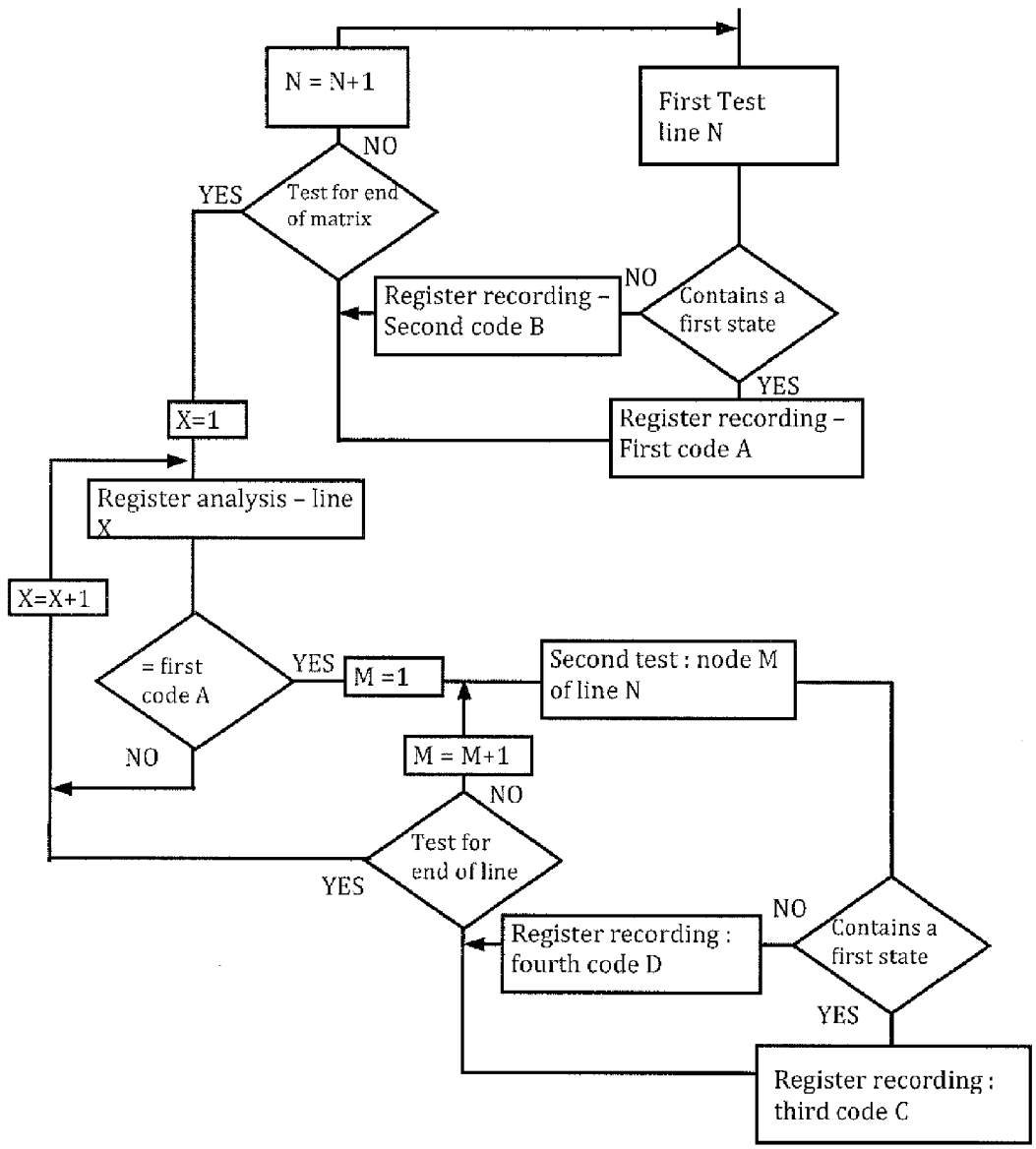
FIG. 3 shows, in a synoptical form, a first operating mode for the circuit according to FIG. 2.

The signal defining the matrix can be written as follows: BA DDCDDDDDDDDD BBA DDDDDCDDDDDD BB In the case of a partial analysis of the line until a first pixel in the first state is detected, the first embodiment defines the next signal:
BABBABB DDC DDDDDC The second mode embodiment defines the next signal:
BA DDC BBA DDDDDC BB These two operating modes of the search circuit can be represented by block diagrams illustrated in FIGS. 3 and 4.

During a first step F1 of the search method, the first test circuit 1 checks whether in a line (a row or column or part of row or column in an initial matrix), i.e. in a first set of pixels in the matrix M, there exists at least one pixel that is in a first state, i.e. in the state searched. The test is totally carried out without searching for the unit value for each pixel. The test carries out the analysis of the entire data line, i.e. the line as a whole.

The result from this analysis is sent into the receiver 3.

The step F1 is then repeated for the other lines L in the matrix M and the result from the different line tests is stored into the receiver 3.

The information contained in the receiver is then analyzed so as to detect which line L comprises a pixel in the first state, i.e. which line is characterized by a first code A in the receiver. This analysis allows to select the lines to be analyzed by the second test circuit 2. The piece of information provided by the first test circuit 1 can also be associated with the line or second test circuit 2 in order to start the second test without passing through the analysis of the receiver.

In a step F2, the second test is carried out in order to analyze the pixels in the line characterized by the first code A. The result from this analysis is sent into the receiver 3. The second test allows to analyze the different nodes in the line studied. This second test is able to discriminate the specific value taken by each node in the line and to send this piece of information into the receiver by means of an associated code.

As indicated above, the test of the line may be full or partial.

If several lines comprise pixels in the first state, the step F2 is repeated for each line characterized by the first code A. The set of data from the tests is sent into the is receiver 3.

Subsequently, the receiver can be transmitted to the computing circuit 4 which will process this piece of information and it is also possible to modify the data matrix M for a new search. For example, a new data acquisition may be carried out and these data are sent into the matrix M in order to search for new data in the first state.

Figure 4:
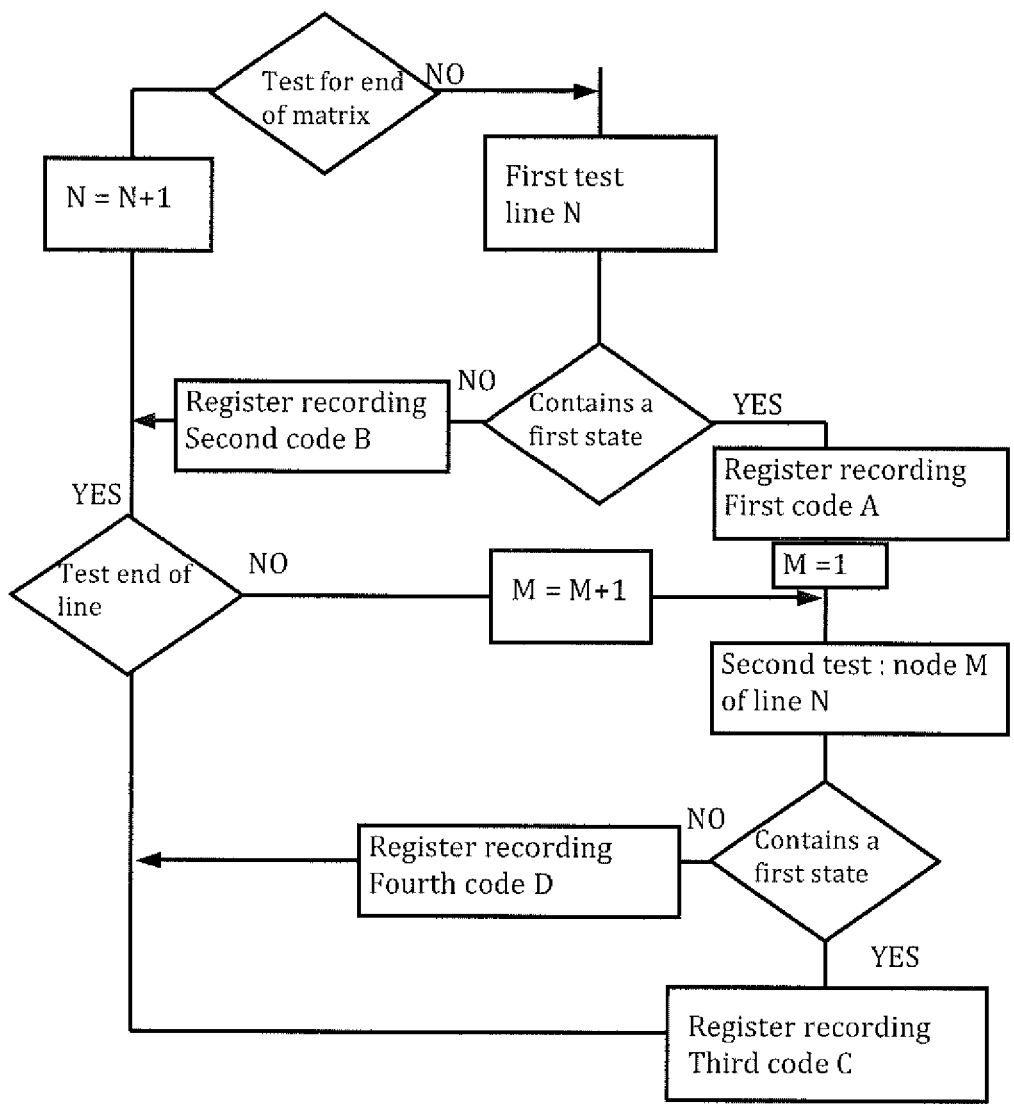
FIG. 4 shows, in a synoptical form, a second operating mode for the circuit according to FIG. 2, FIG. 5 schematically shows an alternative embodiment of a search circuit.

In an alternative embodiment schematically illustrated in FIG. 4, during a first step F1 of the search method, the first test circuit 1 checks whether in a line (a row or a column or a portion of row or column within an initial matrix), i.e. in a first set of pixels within the matrix M, there exists at least one pixel that is in a first state, i.e. in the state searched.

The result from this analysis is sent into the receiver 3.

The receiver is then analyzed in order to detect whether the line tested comprises a pixel in the first state. If the result from the test is the first code A, the line comprises at least one pixel in the first state and the second test in the step F2 is started. If the result from the first test is a second code B, the line has no pixel in the first state and the step F1 is carried out for the next data line.

The step F2 can be started with the analysis of the receiver 3 or by connecting the first test circuit 1 to the second test circuit 2 so that a first code A issued by the first test circuit starts the analysis of the line L by the second test circuit 2. Other means for implementing this sequence of tests are possible.

In a step F2, the second test is carried out in order to analyze the pixels in the line 2, characterized by the first code A. The result from this analysis is sent into the receiver 3. As indicated above, the test of the line can be full or partial.

The step F1 is then repeated for the next line within the matrix.

Thereafter, the receiver can be transmitted to a computing circuit 4 that will process this piece of information and it is also possible to modify the data matrix in order to start a new search. For example, a new data acquisition can be carried out and these data are sent into the matrix in order to search for new pixels in the first state.

In a particular embodiment, all of the pixels in the line is tested and the result from the test is written into the receiver. In this way, when a first code A is written into the receiver, it is followed by a sequence of third code C and fourth code D. The numbers of third codes C and fourth codes D in series are equal to the number of pixels in the line analyzed. Thus, although the size of the signal varies over time according to the number of pixels in the first state, the computing circuit analyzes this information without the need for additional codes indicating an end of line.

The detection of the pixel(s) in the first state can be carried out by any suitable technique.

For example, in case the number of pixels in a line within the matrix is constant, it is possible to add up the pieces of information stored in a line and to compare this value with a value representative of the result expected, for example N*0 when the line contains N pixels. This result can be obtained by comparing each pixel with a threshold value and by incrementing a receiver according to the result from the comparison.

In case the number of pixels in a line varies from one line to the other or when the information is not sent to the search circuit, it is possible to add up or multiply the values of the different pixels in a line. The choice of the mathematical operator is selected according to the piece of information searched.

The line can be tested by using an OR operator or an AND operator.

If the first state is the state 1, one can add up the different pixels (OR operator) in order to detect at least one pixel in the state 1 in a line of pixels in the state 0. If the first state is the state 0, one can multiply the different pixels (AND operator) in order to detect at least one pixel in the state 0 in a line of pixels in the state 1.

Advantageously, the first code A and the second code B are encoded with one bit to simply define the state of a data line and to obtain a maximum compression. The first code A differs from the second code B.

Advantageously, the third code C and the fourth code D are encoded with one bit in order to define the state of the pixel and to obtain the maximum compression. The third code C differs from the fourth code D.

Advantageously, when the receiver stores information in a binary mode, the first code A is identical to the third code C and the second code B is identical to the fourth code D.

In this case, for example, the code '1' represents the first code A and the third code C. The code '1' indicates that the line has one pixel in the first state or the pixel tested is in the first state. This differentiation is carried out by the analysis circuit according to the position of this code within the receiver. Similarly, the code '0' represents the second code B and the fourth code D. The code '0' indicates that the line has no pixel in the first state and the pixel is in the second state. However, it is also possible to have a first code A identical to the fourth code D and the second code B identical to the third code C. The search circuit is then slightly modified, for example by using an additional inverter.

In the embodiment including a partial analysis of the line, odd occurrences of codes '1' are relative to the lines that comprise pixels in the first state. Even occurrences of codes '1' are representative of the pixel in the first state within the line. In this embodiment, as one considers that a line cannot have two pixels in the first state, the first code '1' (or odd occurrences) indicates that the line has one pixel in the first state. The second code '1' (or even occurrences) indicates the position of the pixel in the line and also means that the analysis of the line is over. Thus, the next code '1' (odd occurrence) is relative to another line.

In this way, it is possible to identify in a quick and easy manner the pixels in the first state within the pixel matrix and to easily position them. The signal representing the matrix is highly compressed and easier to implement than in the prior art.

In an alternative embodiment, a row (or column) of data is decomposed into a plurality of lines. For example, the row of data comprises three lines. During the first test, the lines are analyzed in order to determine which line has one pixel in the first state and which line has no pixel in the first state.

According to the result from this first test, the lines are or are not analyzed with the second test in order to determine the position of the pixels in the first state.

In one particularly advantageous embodiment, the data from the first test and the second test are interlaced in order to facilitate the integration of this embodiment into a circuit having a simple architecture.

Particularly, in case the circuit is configured so as to read a line representing a portion of a row or column within an initial matrix (here a portion of row), a row or column within the matrix corresponds to several initial lines within the matrix M.

For example, the circuit can be configured so as to divide a row within the initial matrix into three sub-rows, each sub-rows corresponds to a line within the matrix M. The signal defined after the analysis of the matrix shown in FIG. 2 is as follows:

BBB ABB DDCD BBB BBB BAB DCDD BBB BBB

The first sequence of three second codes (BBB) corresponds to the analysis of the three first lines forming the first row. The second sequence of three codes, a first code A followed by two second codes B (ABB) corresponds to the analysis of the three lines forming the second row. This set of three codes indicates that a pixel in the first state is in the first line of the second row and no pixel in the first state is present in the rest of the second row.

A sequence of four codes (DDCD) is then generated in order to characterize more accurately the line identified by the first code A. Each code corresponds to a piece of data, e.g. a pixel. This sequence of four codes indicates that the pixel in the first state is in the third position in the line. The sequence of four codes is followed by a new sequence of three codes characterizing the next row. The remaining analysis of the matrix is carried out in the same manner as above. In this case, each sequence of three codes including the first code A is followed, preferably immediately, by a sequence of four codes C and D containing at least once the third code C.

In case several lines in the same sequence of three codes are represented by the first code A, there are several sequences of four codes C and D following one another for the more accurate analysis of these different lines. The first sequence of four codes corresponds to the line represented by the first occurrence of the first code A and the following sequences of four codes correspond to the following occurrences.

In this embodiment, the row or column is analyzed once by using different lines. Once the analysis of the row or column is over, a more accurate analysis of the line(s) associated with the first code is carried out. The analysis of the next row or line is then carried out.

In another embodiment, the analysis of the line is carried out just after the occurrence of the first code A, which is close to the embodiment illustrated in FIG. 4. In another embodiment, all the lines are analyzed and then there is a more accurate analysis of the different lines associated with the first code A.

Figure 5:
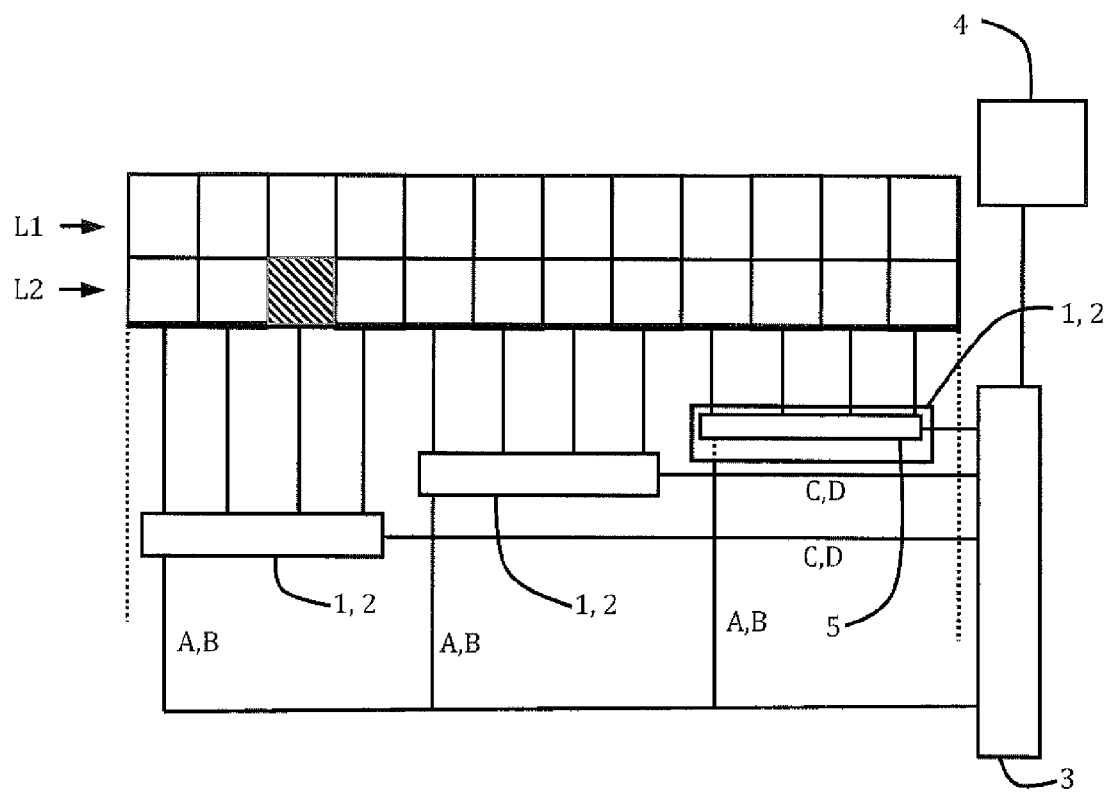

The test of a part of a row or column as a line can be carried out simply as illustrated in FIG. 5. The search circuit comprises a reception device 3 for receiving data sent by a plurality of first test circuits 1 and second test circuits 2. The reception device 3, also called receiver 3, is connected to the first and second test circuits so as to receive the result from the first test circuits 1 for each data line L forming a row or column and to receive the result from the second test circuit 2 for storage nodes.

Several storage nodes are connected to the same first test circuit 1 so as to form a line. In other words, a row or column is divided into a plurality of groups of storage nodes, each group being associated with its own first test circuit 1.

Each line also comprises its own second test circuit so as to show some more accurate information of the line when it is associated with a first code A.

In the advantageous embodiment illustrated in FIG. 5, the first and second test circuits are formed within the same circuit and they share some elements, for example an elementary receiver 5. The general circuit is denoted 1,2. It comprises for example two output lines: a first output line associated with the first test circuit for outputting a first or a second code and a second output line associated with the second test circuit for outputting an plurality of third or fourth codes. In a particularly advantageous way, the first test circuits include an elementary receiver that receives a piece of information from different storage nodes in the associated line. This piece of information is processed so as to provide the first code A or the second code B over an output line connected to the receiver. This receiver in the first test circuit is also associated with the second test circuit so as to easily show the characterization of the line associated with a first code A.

This embodiment makes it possible to easily analyze the matrix by providing a significant compression and by avoiding the use of frame or line buffers.

In a particular embodiment illustrated in the previous example, the more accurate analysis of the lines can be carried out in a sequential manner after each analysis of a group of lines, as necessary. In the case illustrated in the previous example, an accurate analysis by the second test is carried out after an analysis of three lines by a first test, which allows to carry out a complete analysis of each row. Another cycle can be carried out between the frequency of the first test and the frequency of the second test, i.e. the more accurate piece of information of a line can be placed after the general piece of information on the line. It is still possible to analyze a plurality of lines, for example six lines, and to place the possible more accurate analyzes of these lines afterwards.

In this configuration, the second test circuit is configured so as to test a data line or group of lines associated with a first code A and to send the result of this test into the receiver before the first test circuit carries out the test of the next line or group of lines.

In a particular embodiment also illustrated in the previous example, several lines are analyzed simultaneously, each with their first test circuit associated. This configuration allows to increase the data rate of the search circuit by carrying out several analyzes in parallel.

In one particular embodiment, this analysis method is used in a matrix of photodetectors. The photodetectors observe a scene and the result of this observation is stored into a storage node associated with each photodetector. Thus, the scene observed is recorded and transcribed by a piece of information stored in the various storage nodes. When the photodetectors observe the scene repeatedly, the analysis of the scene is carried out preferably between two acquisitions in order to track the evolution of the scene observed.

In the examples above, the rows of pixels are divided into three series of lines, each line comprising four pixels. The matrix could have been divided into columns. The rows or columns could have been decomposed into a plurality of lines, each line comprising a predetermined number of pixels.

It is possible to detect brighter or darker zones of the scene by using the search method described above for the different data lines and to track their movements in a scene by carrying out several acquisitions. The scene observed is analyzed by means of the matrix of pixels.

If the piece of information provided by the photodetectors is of the analog type, it is advantageous to carry out a step of comparing the data provided by the photodetector with a threshold in order to store a binary piece of information representative of the comparison into the storage nodes.

If the piece of information stored in the storage nodes is analog, it is advantageous to make a comparison with a threshold and to use the result from this comparison in order to carry out the step F1 of analyzing the line.

In a particular embodiment, the matrix of data is part of a detection device. The matrix of data is a matrix of pixels where each pixel is associated with a photodetector.

The detection device includes a plurality of photodetectors able to convert the light signal received into an electrical signal. The photodetector is configured so as to detect an electromagnetic radiation in a specific wavelength range.

The photodetector can be formed by any suitable device, for example a photodiode or a quantum-well-type or multi-quantum-well-type device. The photodetector is advantageously configured so as to detect a visible or infrared radiation, preferably, a specific range of the infrared radiation, such as the LWIR, MWIR, or SWIR ranges.

The detection device also includes bias circuits for biasing the photodetector. The bias circuit is configured so that the photodetector 1 works as a current source whose current intensity depends on the electromagnetic radiation received. The photodetector is connected to a circuit that integrates or stores the signal from the photodetector. If the readout circuit includes an integrating capacitor, this capacitor can also be used to define the storage node. It is also possible that the signal present in the readout circuit be sent to the storage node formed by another electronic device.

In order to detect a level '0', it is advantageous to carry out a OR test on the nodes in the same line. In this manner, the result expected is 0 and the presence of a final result equal to 1 results in a more accurate analysis of the row or column.

For example, such an embodiment can be implemented by using a bias line common to the pixel line and a data bus common to this same pixel line. The bias line is connected to the data bus by means of a plurality of switches mounted in parallel. Each pixel is connected to the control electrode of the transistor associated. In this way, if all the pixels are in the second state, all switches are in the off state and the piece of information relative to the bias line is not transmitted over the data bus. In case a pixel is in the first state, the piece of information relative to the bias line is sent over the data bus.

The switch can be formed by a transistor whose conductivity type (e.g. NMOS or PMOS) is selected according to the level of the state searched.

It is also possible to carry out an AND test on the search circuits in the same row or column. In this manner, the result expected is 1 and the presence of a final result equal to 0 results in a more accurate analysis of the row or column.

For example, such an embodiment can be implemented by using a bias line common to the pixel line and a data bus common to the same pixel line. The bias line is connected to the data bus by means of a plurality of switches in series. The series connexion of the various switches allows to connect the bias line to the data bus. Each pixel is connected to the control electrode of its switch associated. In this way, if at least one switch is in the second state, the piece of information relative to the bias line is not transmitted over the data bus. In case all the pixels are in the second state, the piece of information relative to the bias line is sent over the data bus.

Again, when modifying the conductivity type of the different transistors forming the switches, it is possible to test the opposite state of the pixels.

Advantageously, a test according to the OR configuration is used because it allows to connect the bias line to the data bus independently for each transistor. Thus, the same circuit can carry out the second test by sending the state of each pixel successively over the bus by means of its transistor associated. A second switch can be connected in series to the previous switch in order to define whether the first test or the second test is to be carried out. The same data bus is used to get the piece of information relative to the line and each pixel.

In this mode embodiment with a single bus, the encoding is carried out with one bit.

In a preferential way, the bias line is common to the entire matrix.

Advantageously, the readout circuits are arranged according a first arrangement direction defining a row or column of circuits. In this manner, the detection device comprises a plurality of rows or columns of readout circuits. In a preferential way, the storage nodes are arranged as a matrix, i.e. with rows and columns.

After a step of observing a selected scene, the circuits store a piece of information representative of the scene. A step of analyzing the scene is then carried out.

As illustrated in FIG. 2, the detection device can be part of a guiding device for a movable element. In this guiding device, the position of the pixel in the first state is determined within the matrix of photodetectors. This position is sent to a computing circuit 4 which processes this piece of information and sends one or more signals to the propulsion and/or direction system 6 for the movable element.

Advantageously, the computing circuit sends signals that are configured so as to bring said at least one pixel closer to a preferred position in the matrix of photodetectors during the next acquisition step. Advantageously, the computing circuit sends signals that are configured in such a manner that the movable element is displaced so as to position the pixel in the first state, for example, in the middle of the matrix during the next acquisition step.

The search circuit can also be used to test the functionality of the detection device against a calibrated test pattern, which allows to quickly detect nonfunctional or atypical readout circuits. The matrix of photodetectors carries out the acquisition of the calibrated test pattern for a shorter or longer period of time. The pixels are then tested in order to search for those that have a higher or lower brightness compared to a threshold.

The invention claimed is:

1. Search circuit for searching a data within a data matrix, comprising:
   the data matrix arranged in a plurality of data lines, each data line comprising a plurality of data storage nodes, each data storage node being configured so as to store a first state or a second state, the data storage nodes being mainly in the second state,
   a first test circuit configured for testing the state of one of the data lines, the first test circuit being configured so as to determine whether the tested data line has no data storage node in the first state or whether the tested data line has at least one data storage node in the first state, the first test circuit sending a first code when the tested data line has at least one data storage node in a first state or a second code when the tested data line has no data storage node in the first state, a second test circuit configured for testing the state of the plurality of data storage nodes in the tested data line, the second test circuit being configured so as to send a third code when the tested data storage node is in the first state or a fourth code when the tested data storage node is in the second state, the second test circuit being configured so as to test the data storage nodes of the data line when the first test circuit has sent a first code relative to said tested data line, a receiver configured so as to receive the result from the first test circuit for each tested data line and to receive the results from the second test circuit for the tested storage nodes.

2. Circuit according to claim 1, wherein the first code, the second code, the third code and the fourth code are encoded with one bit.

3. Circuit according to claim 1, wherein the data matrix is a matrix of photodetectors associated with a matrix of readout circuits, each readout circuit including an integration node configured for storing the data emitted by the associated photodetector, the integration node forming the data storage node.

4. Circuit according to claim 1, wherein the first test circuit is configured so as to successively test data lines or groups of data lines within the data matrix and to send the result from such tests into the receiver.

5. Circuit according to claim 4, wherein the second test circuit is configured so as to test one data line or a group of data lines associated with a first code and to send the result from this test into the receiver before the first test circuit tests the next data line or group of data lines.

6. Circuit according to claim 5, wherein the second test circuit tests all the data storage nodes of the data line in a first test direction.

7. Circuit according to claim 5, wherein the second test circuit tests all the data storage nodes in the data line in a first test direction until testing a data storage node in the first state.

8. Circuit according to claim 1, wherein the first test circuit comprises a bias line, a data bus representative of the test result, a plurality of switches connected in parallel, each switch connecting the bias line to the data bus, the control electrode of each switch being coupled to the storage node associated so as to cause the switch to be in blocking state or in a passing state.

9. Movable element comprising:

a search circuit according to claim 3, a propulsion and/or rotation system for the movable element, a computing circuit connected to the receiver and configured so as to search for a position of at least one pixel in the first state and to operate the propulsion and/or direction system so as to bring said at least one pixel closer to a preferential position of the matrix of photodetectors during the next acquisition step.

10. Search method for a data storage node in a first state within a data matrix mainly composed of data storage nodes in a second state, the data matrix being divided into a plurality of data lines provided with data storage nodes, comprising:

carrying out a first test for generally testing a data line in order to determine whether the tested data line contains data storage nodes in the first state and sending a code representative of in first test into a receiver, the first test sending a first code when the data line includes a data storage node in the first state, and sending a second code in the other cases, carrying out a second test for individually testing the data storage nodes in the data line associated with a first code, the second test sending a third code when the data storage node comprises a first state and sending a fourth code in the other cases, the results from the second test being sent into the receiver.

* * * * *